US005607713A

United States Patent [19]

Berge

[11] Patent Number: 5,607,713
[45] Date of Patent: Mar. 4, 1997

[54] PROCESS FOR TREATING FRESH MEAT WITH SACCHAROSE

[76] Inventor: Harald M. Berge, Bjerkeellen 33a, 1322 Hovih, Oslo, Norway

[21] Appl. No.: 424,555

[22] Filed: Apr. 17, 1995

Related U.S. Application Data

[63] Continuation of Ser. No. 243,049, May 16, 1994, abandoned, which is a continuation of Ser. No. 9,917, Jan. 27, 1993, abandoned.

[30] Foreign Application Priority Data

Feb. 4, 1992 [CS] Czechoslovakia .................. PV-30392

[51] Int. Cl.$^6$ ................................ A23B 4/20; A23L 1/31; A23L 1/313
[52] U.S. Cl. ...................... 426/332; 426/335; 426/641
[58] Field of Search .................. 426/332, 335, 426/532, 641, 281, 289, 296, 652

[56] References Cited

U.S. PATENT DOCUMENTS

| 4,248,902 | 2/1981 | Eapen et al. | 426/332 |
| 5,262,188 | 11/1993 | Nocquet | 426/641 X |

FOREIGN PATENT DOCUMENTS

| 2037788 | 9/1991 | Canada . | |
| 0013042 | 7/1980 | European Pat. Off. . | |
| 1964244 | 7/1971 | Germany . | |
| 2164171 | 7/1973 | Germany . | |
| 1-231844 | 9/1989 | Japan | 426/332 |
| 2-973364 | 4/1990 | Japan | 426/281 |
| 877695 | 9/1961 | United Kingdom | 426/332 |
| 1401572 | 7/1975 | United Kingdom | 426/641 |
| 2207034 | 1/1989 | United Kingdom . | |
| 2210766 | 6/1989 | United Kingdom | 426/289 |

*Primary Examiner*—Arthur L. Corbin
*Attorney, Agent, or Firm*—Brumbaugh, Graves, Donohue & Raymond

[57] ABSTRACT

The invention is a process for treating fresh meat and for enhancing its durability which comprises contacting a meat surface with powdery saccharose and draining an extract formed. During the process dehydration of meat takes place and also organic acids and PCB compounds, if they are present, are partly eliminated therefrom. Various kinds of meat can be treated in this way, such as beef or salmon.

12 Claims, No Drawings

PROCESS FOR TREATING FRESH MEAT WITH SACCHAROSE

This application is a continuation of application Ser. No. 08/243,049, filed on May 16, 1994, now abandoned, which is a continuation of Ser. No. 08/009,917, filed on Jan. 27, 1993, now abandoned.

TECHNICAL FIELD

The invention relates to a process for treating fresh meat and for enhancing its stability. The process is accompanied by the increase of the proportion of solids (dry matter) in the meat and by the decrease of the proportion of organic acids. The microbiological purity of the meat is maintained.

BACKGROUND ART

Meat can be treated and its durability can be enhanced by means of various processes. Such processes usually comprise the inactivation of microorganisms, i.e. the treatment after which meat becomes an unsuitable medium for the growth of microorganisms. Known processes of meat treatment include physical processes, e.g. air drying, salting, freezing or elimination of the access of oxygen by means of evacuation, use of inert atmosphere or oiling; chemical processes, e.g. additivation with preservatives, such as benzoic acid, curing, etc; and biological processes, e.g. fermentation during the production of thermally non-treated meat products.

The processes as mentioned above for treating fresh meat often suffer from various disadvantages. Some of them are not sufficiently reproducible (air drying), other deteriorate the structure of meat (freezing) or change its organoleptic properties, especially the taste (salting). The addition of preservative does not have these disadvantages, however as its consequence extraneous chemical compounds are introduced into the food chain. Such compounds are often badly degradable in the body or their elimination from the body is troublesome which represents an additional environmental hazard to which men are exposed. Other processes as mentioned above are not generally applicable (fermentation) or sufficiently effective (elimination of the access of oxygen). Moreover, many of these processes are expensive. All these factors have a consequence that there still is a demand for superior processes for meat treatment which efficiently enhance its durability and at the same time are neither deleterious from the biological point of view nor expensive.

DISCLOSURE OF THE INVENTION

The object of the invention is a process for treating fresh meat and for enhancing its durability. Said process is characterized in that meat surface is contacted with powdery saccharose and an extract formed is drained from the meat.

The meat treatment according to the invention can be carried out in various ways. For instance, meat can be covered with saccharose and placed on a suitable support which makes possible the drainage of the extract formed. Such support can be a sieve which is advantageously made of polyamide or other plastic which is not noxious from the point of view of food industry. Saccharose need not be applied on all meat surfaces. If meat is cut into pieces one dimension of which is significantly smaller than the other two dimensions, for instance into steaks, saccharose can be applied only to the upper surface of such pieces. Saccharose penetrates into the meat structure and then leaves the meat as an extract.

The length of the treatment and the amount of saccharose used depend on a plurality of factors including the kind of meat, its structure, the dimensions of treated pieces and the desired ratio of dehydration.

Various kinds of meat are suitable for the treatment according to the invention, for instance meat of various kinds of animals raised for meat, such as beef and in addition also fish meat such as meat of salmon or tolstolobic (Hypophthalmichthys molitrix). Fish meat generally has looser structure and its processing takes shorter time.

Also the size of treated meat pieces may vary. The preferred embodiment comprises the treatment of meat pieces one dimension of which is reduced, e.g. steaks. Such steaks can however be of considerable thickness, e.g. up to 5 cm or even more. The treatment of thinner steaks, of course, takes place more quickly.

A longer time of treatment with the use of higher amounts of saccharose results in a higher degree of meat dehydration, i.e. in increased dry matter content.

An average time of saccharose treatment is about 24 hours. Depending on various factors as mentioned above, shorter and longer time can however be used, for instance time the range of from about 12 to about 72 hours.

The treatment can be carried out at ambient temperature as saccharose prevents the meat from secondary contamination.

After finishing the process according to the invention meat can be further treated according to consumers' demands, for instance by curing, vacuum wrapping and by other known processes, e.g. salting, spicing, etc.

The treatment according to the invention is undemanding, relatively inexpensive and ecologically safe and these are its great advantages. During the treatment not only a part of water but also various noxious substances, such as organic acids and PCB Compounds (polychlorinated biphenyls), if they are present, are partly eliminated from the meat together with the extract. A further advantage of the process is that the resulting meat is microbially safe, even when the treatment is carried out under relatively high ambient temperatures. Saccharose does not remain in the meat and the natural flavour, smell and colour of meat are preserved. Because of the dehydration the structure of meat is enhanced. In the course of the treatment meat does not lose its energy and nutritive substances and owing to its properties it represent a suitable component of rational food.

With the help of the process according to the invention it is possible, depending on the dehydration ratio, to extend the durability to up to several months under general refrigerating conditions, i.e. at temperatures of from 2° to 6° C. The durability of fish meat is approximately up to 3 months and the durability of beef is longer than 6 months.

The saccharose extract which is obtained as a by-product of the process according to the invention may be in most cases used for the production of fodders.

The invention is further explained by means of the following examples. The examples should serve for mere illustrative purposes and the invention is not restricted thereby in any respect.

EXAMPLES OF EMBODIMENTS OF THE INVENTION

Example 1

Fresh salmon halves, worked according to usual practice of food industry, are placed on a polyamide screen and their upper surface is in a homogeneous way covered with powdery saccharose so that it does not fall off. Saccharose dissolves in the meat juice and is drained. After 20 hours sensoric, bacteriological and chemical examination takes place. The sample passes all the tests used. The extract contains 0,25% of organic acids which are determined as acetic acid.

After 7 weeks of refrigeration at a temperature of about 3° C. essentially no change of parameters tested takes place.

Example 2

A beef steak having a thickness of about 20 mm is coated with saccharose, placed in a draining vessel and in a homogeneous way covered with powdery saccharose so that it does not fall off. After 60 hours sensoric, bacteriological and chemical examination takes place. The sample passes all the tests used. A special regard is given to PCB analysis. Whereas starting meat contains 0,200 µg/kg of PCB, the treated sample contains only 0,175 µg/kg of PCB (though the dry matter content of the treated sample is much higher). On the other hand, the extract contains as much as 0,914 µg/kg of PCB.

The resulting meat has good organoleptic characteristics, i.e. colour, smell, consistence and flavour. After 3 months of refrigeration at the temperature of about 3° C. essentially no change of parameters tested takes place.

We claim:

1. A process for treating fresh meat in order to decrease the content of polychlorinated biphenyls and remove water from the meat and thereby enhance the durability of the meat consisting essentially of contacting the meat with powdery saccharose such that the saccharose penetrates the meat and combines with water in the meat to form an extract, and then draining the extract from the meat under conditions such that the meat so treated has a decreased content of polychlorinated biphenyls and enhanced durability upon storage.

2. The process according to claim 1 wherein the treatment is carried out for a period of about 12 to about 72 hours.

3. The process according to claim 2 wherein the meat is contacted with saccharose on a single surface thereof.

4. The process according to claim 3 wherein the meat is contacted with saccharose on an upper surface thereof.

5. The process according to claim 2 wherein the treatment is carried out at ambient temperature.

6. The process according to claim 2 wherein the treatment is carried out for a period of 24 hours.

7. The process according to claim 1 wherein the meat is contacted with the powdery saccharose on a single surface thereof.

8. The process according to claim 7 wherein the meat is contacted on an upper surface thereof.

9. The process according to claim 1 wherein the contacting step is carried out by applying a homogeneous coating of the powdery saccharose to the surface of the meat.

10. The process according to claim 1 wherein the treatment is carried out at ambient temperature.

11. The process according to claim 1 further comprising placing the meat on a suitable support which allows drainage of the extract from the meat.

12. The process according to claim 11 wherein the support is a polyamide screen.

* * * * *